April 17, 1945. D. M. EBERT 2,374,004
GLAUBER'S SALT CONVERSION
Filed Dec. 2, 1941
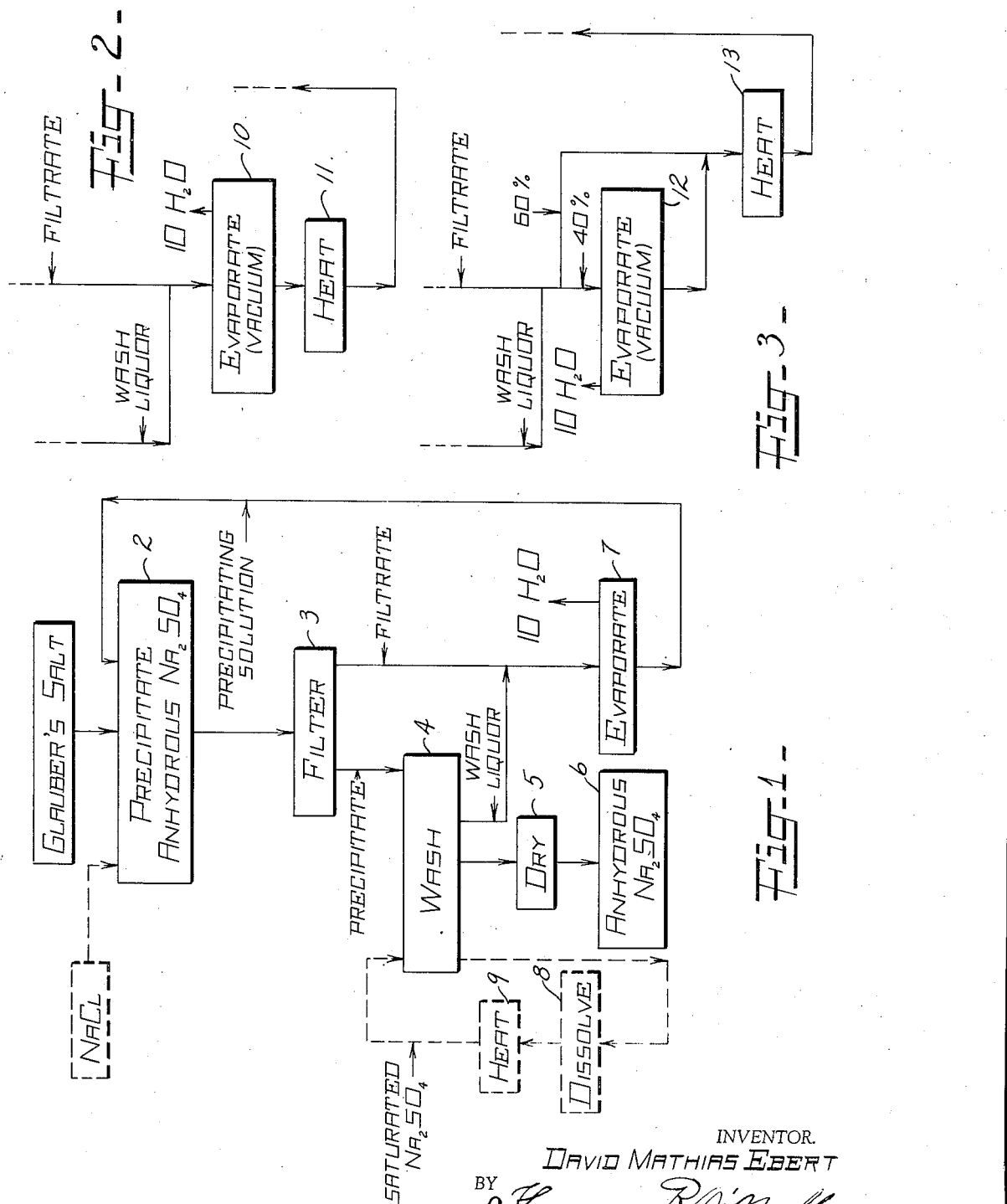
INVENTOR.
DAVID MATHIAS EBERT
BY Thomas R. O'Malley
ATTORNEY Patented Apr. 17, 1945

2,374,004

UNITED STATES PATENT OFFICE 2,374,004

GLAUBER'S SALT CONVERSION

David Mathias Ebert, Wilmington, Del., assignor to American Viscose Corporation, Wilmington, Del., a corporation of Delaware Application December 2, 1941, Serial No. 421,275

17 Claims. (Cl. 23—121)

This invention relates to the conversion of Glauber's salt into anhydrous sodium sulfate. While it may be applied generally to such conversion of Glauber's salt from any source, it is particularly concerned with the production of a commercial grade of anhydrous sodium sulfate from the Glauber's salt recovered from precipitating baths employed in the production of artificial silk from viscose. The Glauber's salt from viscose spinning baths contains a small residual proportion of each of the following substances, sulfuric acid, zinc sulfate, and glucose with about 1% of residual mother liquor.

Glauber's salt, as is well known, is the decahydrate of sodium sulfate and many procedures have heretofore been employed to convert it into anhydrous form since the latter is in greater demand commercially and therefore commands a considerably higher price. It is well known that the transition temperature at and above which Glauber's salt is converted into the anhydrous form is approximately 32.4° C. Below this temperature, Glauber's salt crystallizes out while above this temperature, the anhydrous form is obtained. One procedure of conversion involves allowing the Glauber's salt to melt and then evaporating at temperatures above 32.4° C. while exposed to the atmosphere. This procedure, however, requires an excessively large area for the conversion of a given weight of the Glauber's salt. In addition, it requires considerable time for the necessary evaporation to take place. Another procedure involves the evaporation of the water by boiling it and subsequently calcining to dryness. This process, however, is accompanied with extreme difficulties because of the caking of the anhydrous sodium sulfate upon the heating coils and the other heated surfaces in the boil-off evaporator.

In another procedure heretofore employed, the Glauber's salt is mixed with a hot saturated solution of sodium sulfate and the anhydrous salt is allowed to settle. The supernatant solution is then run off and is allowed to evaporate and cool until the formation of crystals indicates that it is saturated. This saturated solution of sodium sulfate is again heated and used to convert more Glauber's salt into the anhydrous form. This procedure, while not relying upon direct boiling-off of the water to obtain the relatively dry anhydrous salt, nevertheless still involves heating saturated solutions of sodium sulfate, and it has been found by actual experience with Glauber's salt recovered from viscose precipitating baths that serious caking accompanies the reheating, especially when it is attempted by such reheating to attain a temperature of the order of 185° F. which is necessary to obtain the maximum yield. In actual practice, it has been found that severe caking takes place even when transferring heat into a saturated sodium sulfate solution at as low a temperature as 117° F. The caking which occurs upon the heating coils reduces the heat conductivity and on that account requires greater heating capacity. In such cases, it has been found necessary to discontinue the process, empty the system, and remove the cake from the coils by boiling water. At the temperature just mentioned, the caked layer, being dehydrated and baked by contact with the coils, is fused into a solid, cement-like layer which frequently takes as much as two hours of vigorous boiling for removal. In a continuous system, where reheated saturated sodium sulfate solution is returned to the converter to throw out additional anhydrous sodium sulfate, and the supernatant solution is reconcentrated and reheated for recycling, it has been found that the difficulties are not localized entirely within the reheater, but that the pipe from the reheating device to the converter sometimes become clogged with the caked sodium sulfate and that lumps of the caked salt are even carried over into the converter and, because of their dense cement-like character and slow dissolving rate, are not greatly changed in the converter so that the product obtained is lumpy and non-homogeneous and is not as readily and uniformly soluble as the crystalline anhydrous sodium sulfate normally produced by precipitation from a hot supersaturated solution.

By employing the novel procedure of the invention, it has been found possible to avoid entirely or at least to minimize and localize the effects of caking. This is accomplished by employing a concentrated solution of a sodium salt other than sodium sulfate, such as the chloride, bromide, or nitrate, as the precipitating solution in converting the Glauber's salt into the anhydrous form at temperatures above the transition temperature. It has been found also that such caking difficulties are avoided in the reheating of the precipitating solution even when the precipitating solution contains substantial amounts of sodium sulfate provided the other sodium salt is present in greatly predominating proportion. The sodium salt chosen should have the property of increasing solubility as the temperature rises and preferably its solubility should be on the order of or higher than that of sodium sulfate.

In general, the procedure in accordance with the invention involves the conversion of Glauber's salt into anhydrous sodium sulfate by mixing the Glauber's salt with a heated sodium salt solution, such as sodium chloride, filtering the precipitated anhydrous salt, evaporating enough water from the filtrate to compensate for the amount of water introduced by the hydrated sodium sulfate in the converter, reheating the concentrated sodium salt solution either simultaneously with or subsequent to the evaporation of water and returning the reheated concentrated sodium salt solution to the converter where it precipitates the anhydrous sodium sulfate from additional Glauber's salt.

The concentration of the sodium salt other than sulfate in the heated solution to be used as a precipitating solution may vary considerably. It should be such, however, that the concentration of sodium sulfate cannot build up to a greater concentration than about 8 to 10% in that portion of the system where it is subjected to reheating or to simultaneous evaporation and reheating. By keeping the sodium sulfate concentration below this amount, caking difficulties are entirely avoided. The greater the quantity of the sodium salt other than sulfate in this precipitating solution, the greater is the yield of anhydrous sodium sulfate. The greater yield is obtainable since a larger proportion of the sulfate is precipitated when a higher concentration of the other salt is employed and less of the sulfate is carried through in the filtrate at any given temperature, and in addition, because of the fact that the greater concentration of the salt other than sulfate present in the solution enables it to be heated to a higher temperature without any tendency to cake which in turn enables the precipitation of anhydrous sulfate to occur at a correspondingly raised temperature at which it is less soluble. Taking sodium chloride as an example, by starting with a saturated sodium chloride solution at about 180° F., the filtrate obtained from the product is converted after evaporation and reheating to a precipitating solution containing on the order of about 2 to 3% of sodium sulfate and enough sodium chloride to make the concentration of the solution substantially although not quite saturated with respect thereto. By employing such a precipitating medium in the conversion step, approximately 90% of the sodium sulfate introduced as Glauber's salt is precipitated as the anhydrous form. If desired, enough additional sodium chloride, or other sodium salt, may be added to the converter in addition to the saturated salt solution to saturate the water of hydration introduced by the Glauber's salt. This procedure gives a yield of approximately 97% of sodium sulfate introduced as Glauber's salt, but it has the disadvantage that it increases contamination of the anhydrous sodium salt with sodium chloride which in turn necessitates considerably more washing if less contaminating salt is desired in the product.

The temperature to which the precipitating solution is heated is not critical, it being only necessary that the temperature be high enough so that the batch of Glauber's salt in the converter is raised to a temperature in excess of the transition temperature of the decahydrate. However, it is preferred to raise the temperature as high as possible in order to obtain the maximum yield during the precipitation. For practical purposes, the highest temperature to which the precipitating solution can be heated without charring of the glucose which is carried by the precipitating solution is about 185° F.

The anhydrous product obtained from the precipitation as above described contains on the order of about 2% of sodium chloride. If desired, the product may be washed with a small amount of water or preferably with a hot saturated sodium sulfate solution which may be applied by spraying. The saturated sodium sulfate solution used for washing should be above the transition temperature and preferably considerably above it. Since such a small amount of wash solution is needed, especially when it is in heated condition, to remove substantially all of the contaminating salt, no serious difficulties arise from any tendency to cake. The wash solution need not be so saturated that it will crystallize out and cake in the heating device at the temperature to which it is heated before it is applied to the product. Since such a small quantity of wash solution is involved, cruder and more inexpensive forms of heating vessels or heat exchangers may be employed to raise the temperature of the saturated sodium sulfate solution, and, because of their comparative inexpensiveness, a unit having a larger heating surface may be employed at a comparatively low temperature gradient between the heating surface and the solution. In addition, agitating means may be furnished which together with the low temperature gradient between the heat transfer surface and the solution being heated may function satisfactorily and without excessive cost to prevent entirely any caking of the salt upon the heating surface. If desired, a suitable filter may be employed in the line from the vessel employed in heating the washing solution and the spraying nozzle or other effluent devices by which the washing solution is directed upon the anhydrous sodium sulfate. The procedure in accordance with the invention even when employing a wash solution of substantially saturated sodium sulfate to remove contaminating salt, requires the heating of only one-fourth of a ton of substantially saturated sodium sulfate solution for each ton of anhydrous sodium sulfate produced as compared to about 50 to 60 tons of saturated sodium sulfate solution per ton of anhydrous salt produced required to be heated where a solution of this character is employed in converting the Glauber's salt into anhydrous sodium sulfate. Thus, proceeding in accordance with this invention provides for a minimization practically to the extent of effective elimination, of the caking difficulties involved in converting Glauber's salt into anhydrous sodium sulfate in accordance with the procedures heretofore employed. In addition, the effects of heating saturated sodium sulfate solution are strictly localized. The yield is high, on the order of about 85 to 95% and when a heated sodium sulfate solution is employed to wash the product, a final product containing only about one-tenth per cent of sodium salt other than sulfate is obtained. Besides the high yield, and the commercial purity of the product, the procedure in accordance with the invention is accompanied by the additional advantages of reduced cost of heating, agitating, and reduced depreciation of equipment. The equipment employed may be such as to operate continuously or to handle successive batches.

The drawing is illustrative of the invention and presents modifications thereof in flow sheet form.

Figure 1 shows one form of the procedure in accordance with the invention,

Figure 2 illustrates a modification in the treatment of the precipitating solution, Figure 3 illustrates another modification of the invention.

In Figure 1, the Glauber's salt is mixed with the sodium salt precipitating solution in the converter 2 where precipitation of the anhydrous sodium sulfate occurs. The slurry is sent to the filter 3, from which the filter cake obtained is sprayed or washed at 4, and dried at 5 to obtain the product 6. The filtrate from filter 3 proceeds to an evaporator 7. The wash liquor from the filter cake washing step is added to the filtrate and proceeds with it to the evaporator 7, where evaporation of enough water takes place to compensate for the amount of water introduced into the system as water of hydration in the Glauber's salt. In this figure, the filtrate is heated simultaneously with the evaporation of water to the desired temperature, preferably about 180° F., for the subsequent precipitation step in order to keep the temperature in the converter as high above the transition temperature as possible, and thereby to obtain the greatest yield. As shown in Figure 1, the heated filtrate or precipitating solution is returned to the converter to precipitate additional anhydrous sulfate from another batch of Glauber's salt. As stated above, the precipitating solution contains a certain amount of sodium sulfate, such as 2 to 3% when saturated sodium chloride is employed. In order to increase the proportion of sodium chloride and also to compensate for any loss of such salt from the precipitating solution (such as results from the fact that a small amount of this salt is removed with the product), an additional small amount of the precipitating salt, such as sodium chloride, may be added to each batch formed by the mixing of Glauber's salt with the precipitating solution. As shown in Figure 1, a small part of the filter cake may be dissolved in water at 8 and heated at 9 to obtain a hot saturated sodium sulfate solution which may be sprayed upon the filter cake at 4. The amount of saturated sodium solution needed to be heated at this stage is comparatively insignificant as compared to the great amount of precipitating solution needed to obtain a good yield of anhydrous sodium sulfate, and because of this minimization of the amount of saturated sodium sulfate solutions needed to be heated and because of the localization of such solutions, the invention has substantially eliminated the caking difficulties heretofore encountered in converting Glauber's salt to anhydrous sodium sulfate by similar procedures.

In Figure 2, a modified procedure of treating the filtrate is shown in which the filtrate (and any wash liquor) is subjected to evaporation in a vacuum evaporator at 10, the vacuum enabling evaporation to occur rapidly without the employment of heating coils. In this manner, the heat of evaporation is obtained from the sensible heat of the solution itself without heat interchange occurring in the evaporators. The concentrated precipitating solution is then heated at 11 in a suitable heat exchanger or other heating vessel. This system has the advantage that no heated surfaces are needed in the evaporator to transfer into the mass the very large amounts of heat needed to make up the latent heat of vaporization of the water removed, and the heat exchanging is restricted to the apparatus at stage 11.

In Figure 3, a modified form of the invention which is preferred, is shown. In this case, the filtrate and wash liquor is divided, part only (40% as illustrated) being sent to the vacuum evaporator 12 where the water corresponding to the water of hydration introduced by the Glauber's salt is removed and the remainder (60%) being bypassed around the evaporator and being introduced with the product from the evaporator to the heat exchanger 13 where it is heated to the desired temperature. This embodiment reduces the evaporator equipment needed and any crystals formed in the evaporator as a result of supersaturation exhibit no tendency to cake in the evaporator and, in addition, keep the concentration of sodium sulfate in the heating stage 13 at a somewhat reduced figure until they are completely dissolved.

While preferred embodiments of the invention have been disclosed, the description is intended to be illustrative only, and it is to be understood that changes and variations may be made without departing from the spirit or scope of the invention as defined by the appended claims.

What I claim is:

1. In a method of producing anhydrous sodium sulfate from a hydrated sodium sulfate, the steps of raising the temperature of the hydrated salt above its transition temperature entirely by mixing therewith a heated concentrated solution containing as the predominating solute constituent a soluble sodium salt whose solubility increases with temperature, separating from the solution the anhydrous sodium sulfate precipitated therein, then evaporating and heating said solution, and returning said heated concentrated solution for mixing with additional hydrated salt.

2. In a method of producing anhydrous sodium sulfate from a hydrated sodium sulfate, the steps of raising the temperature of the hydrated salt above its transition temperature entirely by mixing therewith a heated concentrated solution containing as the predominating solute constituent a soluble sodium salt whose solubility increases with temperature together with sodium sulfate not in excess of 10% concentration, separating from the solution anhydrous sodium sulfate precipitated therein, then evaporating and heating said solution, and returning said heated concentrated solution for mixing with additional hydrated salt.

3. In a method of producing anhydrous sodium sulfate from a hydrated sodium sulfate, the steps of raising the temperature of the hydrated salt above its transition temperature entirely by mixing therewith a heated concentrated solution containing as the predominating solute constituent a soluble sodium salt whole solubility is at least of the order of that of sodium sulfate and increases with temperature, separating from the solution the anhydrous sodium sulfate precipitated therein, then evaporating water therefrom substantially corresponding to the amount introduced in the hydrated salt, heating said evaporated solution, and returning said heated concentrated solution for mixing with additional hydrated salt.

4. In a method of producing anhydrous sodium sulfate from a hydrated sodium sulfate, the steps of raising the temperature of the hydrated salt above its transition temperature entirely by mixing therewith a heated concentrated solution containing as the predominating solute constituent a soluble sodium salt whose solubility increases with temperature, separating from the solution the anhydrous sodium sulfate precipitated therein, washing the anhydrous salt with a relatively small proportion of heated concentrated sodium sulfate solution, evaporating water from the solution separated from the anhydrous salt substantially corresponding to the amount of water introduced in the hydrated salt, heating the solution separated from the anhydrous salt, and returning said heated concentrated solution for mixing with additional hydrated salt.

5. In a method of producing anhydrous sodium sulfate from a hydrated sodium sulfate, the steps of raising the temperature of hydrated salt above its transition temperature entirely by mixing therewith a heated concentrated solution containing as the predominating solute constituent a soluble sodium salt whose solubility increases with temperature, separating from the solution the anhydrous sodium sulfate precipitated therein, washing the anhydrous salt with a relatively small proportion of heated concentrated sodium sulfate solution, combining the wash liquor with the solution separated from the anhydrous salt, evaporating water from said combined solution to an extent substantially corresponding to the amount of water introduced in the hydrated salt, heating said combined solution, and returning said heated concentrated solution for mixing with additional hydrated salt.

6. In a method of producing anhydrous sodium sulfate from a hydrated sodium sulfate, the steps of raising the temperature of the hydrated salt above its transition temperature entirely by mixing therewith a concentrated solution heated to a temperature of about 180° F. containing as the predominating solute constituent a soluble sodium salt whose solubility is at least of the order of that of sodium sulfate and increases with temperature, separating from the solution the anhydrous sodium sulfate precipitated therein, evaporating an amount of water from said solution substantially corresponding to the amount of water introduced in the hydrated salt, heating said solution to a temperature of about 180° F., and returning said heated concentrated solution for mixing with additional hydrated salt.

7. In a method of producing anhydrous sodium sulfate from a hydrated sodium sulfate, the steps of raising the temperature of the hydrated salt above its transition temperature entirely by mixing therewith a concentrated solution heated to a temperature of about 180° F. containing as the predominating solute constituent a soluble sodium salt whose solubility is at least of the order of that of sodium sulfate and increases with temperature, separating from the solution the anhydrous sodium sulfate precipitated therein, washing the anhydrous salt with a relatively small proportion of a heated sodium sulfate solution, evaporating water from the solution separated from the anhydrous salt to an extent substantially corresponding to the amount of water introduced in the hydrated salt, heating the evaporated solution to a temperature of about 180° F., and returning said heated concentrated solution for mixing with additional hydrated salt.

8. In a method of producing anhydrous sodium sulfate from a hydrated sodium sulfate, the steps of raising the temperature of the hydrated salt above its transition temperature entirely by mixing therewith a heated saturated solution containing as the predominating solute constituent a soluble sodium salt whose solubility is at least of the order of that of sodium sulfate and increases with temperature, separating the anhydrous sodium sulfate precipitated therein from the solution, evaporating water from said solution substantially corresponding to the amount of water introduced in the hydrated salt, heating said solution, and returning said heated concentrated solution for mixing with additional hydrated salt.

9. In a method of producing anhydrous sodium sulfate from a hydrated sodium sulfate, the steps of raising the temperature of the hydrated salt above its transition temperature entirely by mixing therewith a heated saturated solution containing as the predominating solute constituent a soluble sodium salt whose solubility increases with temperature, separating from the solution, the anhydrous sodium sulfate precipitated therein, washing the anhydrous salt with a relatively small proportion of a heated substantially saturated sodium sulfate solution, combining said wash liquor with the solution separated from the anhydrous salt, and evaporating said combined solution to remove an amount of water corresponding to the amount of water introduced in the hydrated salt, heating the combined solution to a temperature of about 180° F., and returning said heated concentrated solution for mixing with additional hydrated salt.

10. In a method of producing anhydrous sodium sulfate from a hydrated sodium sulfate, the steps of raising the temperature of the hydrated salt above its transition temperature entirely by mixing therewith a heated concentrated solution containing sodium chloride as the predominating solute constituent, separating from the solution the anhydrous sodium sulfate precipitated therein, then evaporating and heating said solution, and returning said heated concentrated solution for mixing with additional hydrated salt.

11. In a method of producing anhydrous sodium sulfate from a hydrated sodium sulfate, the steps of raising the temperature of the hydrated salt above its transition temperature entirely by mixing therewith a heated concentrated solution containing sodium chloride as the predominating solute constituent, separating from the solution the anhydrous sodium sulfate precipitated therein, then evaporating water from said solution substantially corresponding to the amount of water introduced by the hydrated salt, heating said solution and returning said heated concentrated solution for mixing with additional hydrated salt.

12. In a method of producing anhydrous sodium sulfate from a hydrated sodium sulfate, the steps of raising the temperature of the hydrated salt above its transition temperature entirely by mixing therewith a heated concentrated solution containing sodium chloride as the predominating solute constituent, separating from the solution the anhydrous sodium sulfate precipitated therein, washing the anhydrous salt with a relatively small proportion of a heated concentrated sodium sulphate solution, combining the wash liquor with the solution separated from the anhydrous salt, evaporating an amount of water therefrom substantially corresponding to the amount introduced in the hydrated salt, heating said combined solution, and returning said heated concentrated solution for mixing with additional hydrated salt.

13. In a method of producing anhydrous sodium sulfate from a hydrated sodium sulfate, the steps of raising the temperature of the hydrated salt above its transition temperature entirely by mixing therewith a concentrated solution heated to a temperature of about 180° F. containing sodium chloride as the predominating solute constituent, separating from the solution the anhydrous sodium sulfate precipitated therein, evaporating water therefrom to correspond substantially to the amount of water introduced in the hydrated salt, heating said solution to a temperature of about 180° F., and returning said heated concentrated solution for mixing with additional hydrated salt.

14. In a method of producing anhydrous sodium sulfate from a hydrated sodium sulfate, the steps of raising the temperature of the hydrated salt above its transition temperature entirely by mixing therewith a concentrated solution heated to a temperature of about 180° F., containing sodium chloride as the predominating solute constituent together with sodium sulfate not in excess of 10% concentration, separating from the solution the anhydrous sodium sulfate precipitated therein, evaporating water therefrom to correspond substantially to the amount of water introduced in the hydrated salt, heating said solution to a temperature of about 180° F., and returning said heated concentrated solution for mixing with additional hydrated salt.

15. In a method of producing anhydrous sodium sulfate from a hydrated sodium sulfate, the steps of raising the temperature of the hydrated salt above its transition temperature entirely by mixing therewith a concentrated solution heated to a temperature of about 180° F., containing sodium chloride as the predominating solute constituent together with about 2 to 3% of sodium sulfate, separating from the solution the anhydrous sodium sulfate precipitated therein, evaporating water from said separated solution to an extent substantially corresponding to the amount of water introduced by the hydrated salt, heating said solution to a temperature of about 180° F., and returning said heated concentrated solution for mixing with additional hydrated salt.

16. In a method of producing anhydrous sodium sulfate from a hydrated sodium sulfate, the steps of raising the temperature of the hydrated salt above its transition temperature entirely by mixing therewith a concentrated solution heated to a temperature of about 180° F., containing sodium chloride as the predominating solute constituent, separating from the solution the anhydrous sodium sulfate precipitated therein, subjecting at least a portion of said separated solution to vacuum evaporation without transferring heat into the solution being evaporated, heating substantially all of the separated solution to a temperature of about 180° F., and returning said heated concentrated solution for mixing with additional hydrated salt.

17. In a method of producing anhydrous sodium sulfate from a hydrated sodium sulfate, the steps of raising the temperature of the hydrated salt above its transition temperature entirely by mixing therewith a concentrated solution heated to a temperature of about 180° F., containing sodium chloride as the predominating solute constituent, and about 2 to 3% of sodium sulfate, separating from the solution the anhydrous sodium sulfate precipitated therein, washing the anhydrous salt with a relatively small proportion of a heated concentrated sodium sulfate solution, combining the wash liquor with the solution separated from the anhydrous salt, evaporating an amount of water from at least a portion of said combined solution substantially corresponding to the amount of water introduced by the hydrated salt, heating substantially all of said combined solution to a temperature of about 180° F. and returning said heated concentrated solution for mixing with additional hydrated salt

DAVID MATHIAS EBERT.